US008451753B2

(12) United States Patent
Vanga et al.

(10) Patent No.: US 8,451,753 B2
(45) Date of Patent: May 28, 2013

(54) SYSTEMS AND METHODS FOR THE CONFIGURATION OF SUBSTATION REMOTE TERMINALS WITH A CENTRAL CONTROLLER

(75) Inventors: Venu Gopala Reddy Vanga, Hyderabad (IN); Anjani Prasad V. V. S. Achanta, Hyderabad (IN); Suneel Kumar Vuriti, Hyderabad (IN)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 12/881,579

(22) Filed: Sep. 14, 2010

(65) Prior Publication Data
US 2012/0063354 A1 Mar. 15, 2012

(51) Int. Cl.
*H04L 12/28* (2006.01)

(52) U.S. Cl.
USPC ........... 370/254; 370/255; 370/257; 370/259; 370/272; 370/282

(58) Field of Classification Search
USPC ................................ 370/254–259, 270, 282
See application file for complete search history.

(56) References Cited

U.S. PATENT DOCUMENTS

| 4,057,785 | A | * | 11/1977 | Furniss et al. | 340/870.15 |
|---|---|---|---|---|---|
| 4,254,472 | A | * | 3/1981 | Juengel et al. | 702/188 |
| 4,264,960 | A | * | 4/1981 | Gurr | 700/295 |
| 5,179,376 | A | * | 1/1993 | Pomatto | 340/870.02 |
| 5,490,134 | A | * | 2/1996 | Fernandes et al. | 370/466 |
| 5,517,423 | A | * | 5/1996 | Pomatto | 700/286 |
| 5,758,071 | A | * | 5/1998 | Burgess et al. | 709/220 |
| 5,822,531 | A | * | 10/1998 | Gorczyca et al. | 709/221 |
| 6,085,244 | A | * | 7/2000 | Wookey | 709/224 |
| 6,308,283 | B1 | * | 10/2001 | Galipeau et al. | 714/6.23 |
| 7,085,830 | B1 | | 8/2006 | Singhal et al. | |
| 7,114,021 | B2 | * | 9/2006 | Seshadri | 710/104 |
| 7,353,259 | B1 | | 4/2008 | Bakke et al. | |
| 7,587,473 | B2 | * | 9/2009 | Benco et al. | 709/220 |
| 7,743,012 | B2 | * | 6/2010 | Chambers et al. | 709/203 |
| 7,941,786 | B2 | * | 5/2011 | Scott et al. | 717/121 |

(Continued)

FOREIGN PATENT DOCUMENTS
EP    1715627 A1    10/2006

OTHER PUBLICATIONS

European Search Report of Application No. 11181160.0-2416 dated Jan. 1, 2012.

*Primary Examiner* — Andrew Lai
*Assistant Examiner* — Andrew C Lee
(74) *Attorney, Agent, or Firm* — Sutherland Asbill & Brennan LLP

(57) ABSTRACT

Systems and methods for the configuration of substation remote terminals with a central controller are provided. A message identifying a current status of a remote terminal unit ("RTU") associated with a remote power substation may be received by a central controller associated with a power system. Based upon an analysis of the received message, a request for configuration data associated with the RTU may be communicated by the central controller to the RTU. In response to the request, the configuration data may be received by the central controller from the RTU. Based upon the received configuration data, the central controller may update a configuration database comprising information associated with the configuration of the RTU. In this regard, supervisory control and data acquisitions operations with the RTU by the central controller may be facilitated.

17 Claims, 2 Drawing Sheets

U.S. PATENT DOCUMENTS

| | | | |
|---|---|---|---|
| 2002/0049925 A1* | 4/2002 | Galipeau et al. | 714/6 |
| 2004/0267971 A1* | 12/2004 | Seshadri | 710/8 |
| 2005/0027657 A1* | 2/2005 | Leontiev et al. | 705/59 |
| 2006/0075001 A1* | 4/2006 | Canning et al. | 707/203 |
| 2006/0206608 A1* | 9/2006 | Naito et al. | 709/224 |
| 2006/0217111 A1* | 9/2006 | Marolia et al. | 455/418 |
| 2006/0253733 A1* | 11/2006 | Galipeau et al. | 714/6 |
| 2006/0294221 A1* | 12/2006 | Graupner et al. | 709/224 |
| 2007/0156291 A1* | 7/2007 | Curt et al. | 700/286 |
| 2010/0030875 A1* | 2/2010 | Visser et al. | 709/220 |

* cited by examiner

SYSTEMS AND METHODS FOR THE CONFIGURATION OF SUBSTATION REMOTE TERMINALS WITH A CENTRAL CONTROLLER

FIELD OF THE INVENTION

Embodiments of the invention relate generally to control systems and more specifically to systems and methods for configuration of substation remote terminals with a central controller.

BACKGROUND OF THE INVENTION

Control systems are utilized in a wide variety of different applications. For example, control systems are utilized to monitor one or more power plants and power substations that are associated with the power plants and/or a power distribution network. In power control systems, a central controller typically communicates with one or more remote controllers associated with various substations. In this regard, data can be collected from the substations for processing by the central controller. Additionally, commands can be communicated by the central controller to the remote controllers.

Typically, a remote controller for a substation is manually configured at the remote substation site. In order to bring the remote controller into a control network and facilitate communication between the remote controller and the central controller, configuration data for the remote controller is provided to the central controller. In conventional systems, the configuration data for a remote controller is manually entered at the central controller. However, the manual entry of configuration data at both the substation site and a central site often leads to data entry errors, thereby resulting in relatively expensive troubleshooting procedures to properly configure a remote controller. Accordingly, improved systems and methods for facilitating the configuration of substation remote terminals with a central controller are desirable.

BRIEF DESCRIPTION OF THE INVENTION

Some or all of the above needs and/or problems may be addressed by certain embodiments of the invention. Embodiments of the invention may include systems and methods for the configuration of a substation remote terminal with a central controller. According to one embodiment of the invention, there is disclosed a method for configuring a substation remote terminal with a central controller. A message identifying a current status of a remote terminal unit ("RTU") associated with a remote power substation may be received by a central controller associated with a power system. Based upon an analysis of the received message, a request for configuration data associated with the RTU may be communicated by the central controller to the RTU. In response to the request, the configuration data may be received by the central controller from the RTU. Based upon the received configuration data, the central controller may update a configuration database comprising information associated with the configuration of the RTU. In this regard, supervisory control and data acquisition operations with the RTU by the central controller may be facilitated.

According to another embodiment of the invention, there is disclosed a system for configuration of a substation remote terminal with a central controller. The system may include a central controller associated with a power system and a remote terminal unit ("RTU") situated at a power substation associated with the power system. The RTU may be configured to (i) communicate, to the central controller, a message identifying a current status of the RTU, (ii) receive, from the central controller, a request for configuration data associated with the RTU, and (iii) communicate the requested configuration data to the central controller. The central controller may be configured to (i) receive the message communicated by the RTU, (ii) communicate the request for configuration data based upon an analysis of the received message, (iii) receive the configuration data, and (iv) update, based upon the received configuration data, a configuration database comprising information associated with the configuration of the RTU in order to facilitate supervisory control an data acquisition operations with the RTU by the central controller.

According to another embodiment of the invention, there is disclosed a method for configuring a substation remote terminal with a central controller. A remote terminal unit ("RTU") associated with a remote power substation may be configured. The remote power substation may be associated with a power system. A network connectivity with a central controller associated with the power system may be detected by the RTU. Based at least in part on the detected network connectivity, a message identifying a current status of the RTU may be communicated by the RTU to the central controller. Based upon an analysis of the message by the central controller, a request for configuration data associated with the RTU may be received by the RTU from the central controller. In response to the request, the configuration data associated with the RTU may be communicated by the RTU to the central controller. The central controller may utilize the configuration data to update a configuration database comprising information associated with the configuration of the RTU. In this regard, supervisory control and data acquisition operations with the RTU by the central controller may be facilitated.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
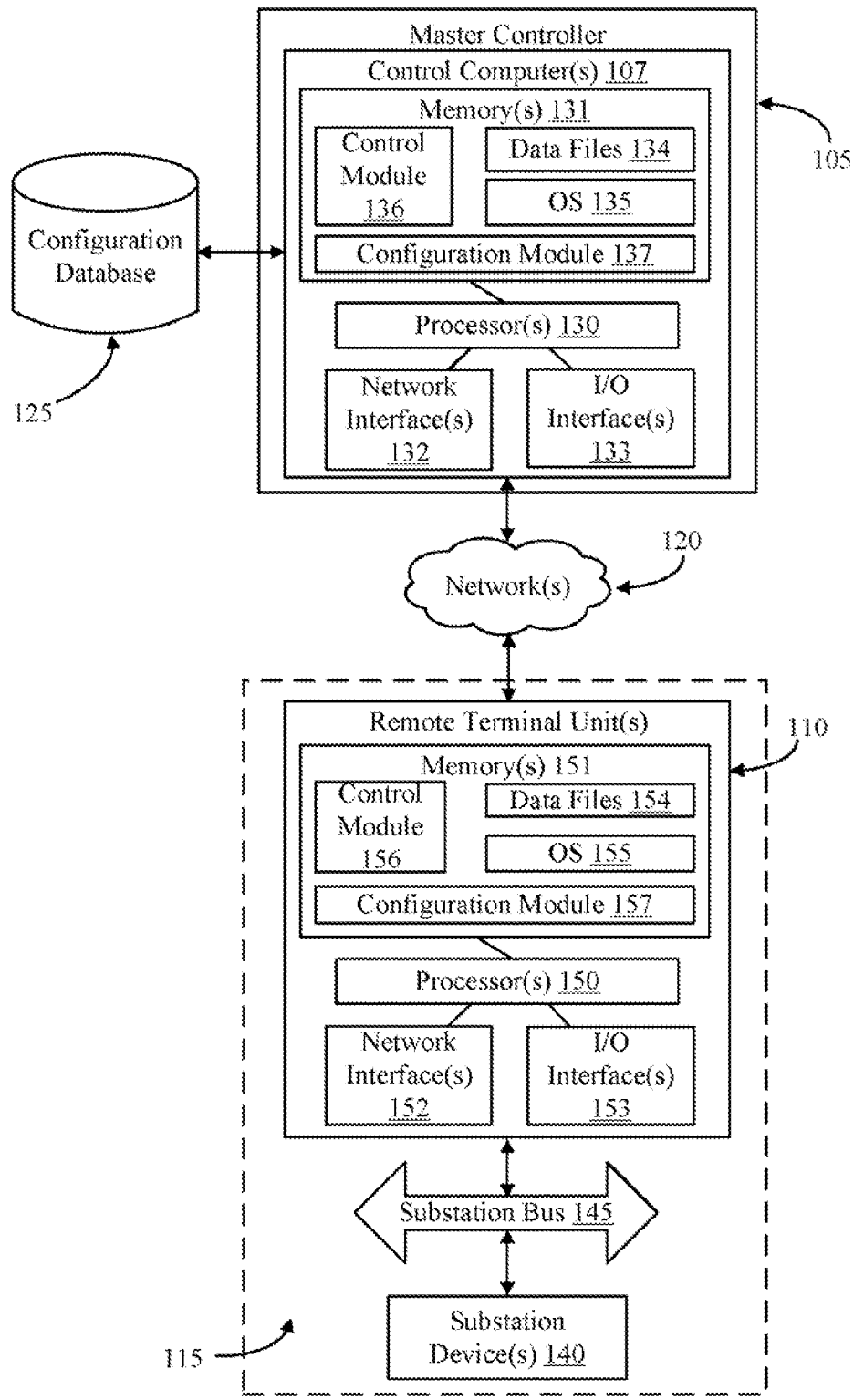

Having thus described the invention in general terms, reference will now be made to the accompanying drawings, which are not necessarily drawn to scale, and wherein:

FIG. 1 is a schematic diagram of one example control system that may be utilized in accordance with various embodiments of the invention.

Figure 2:
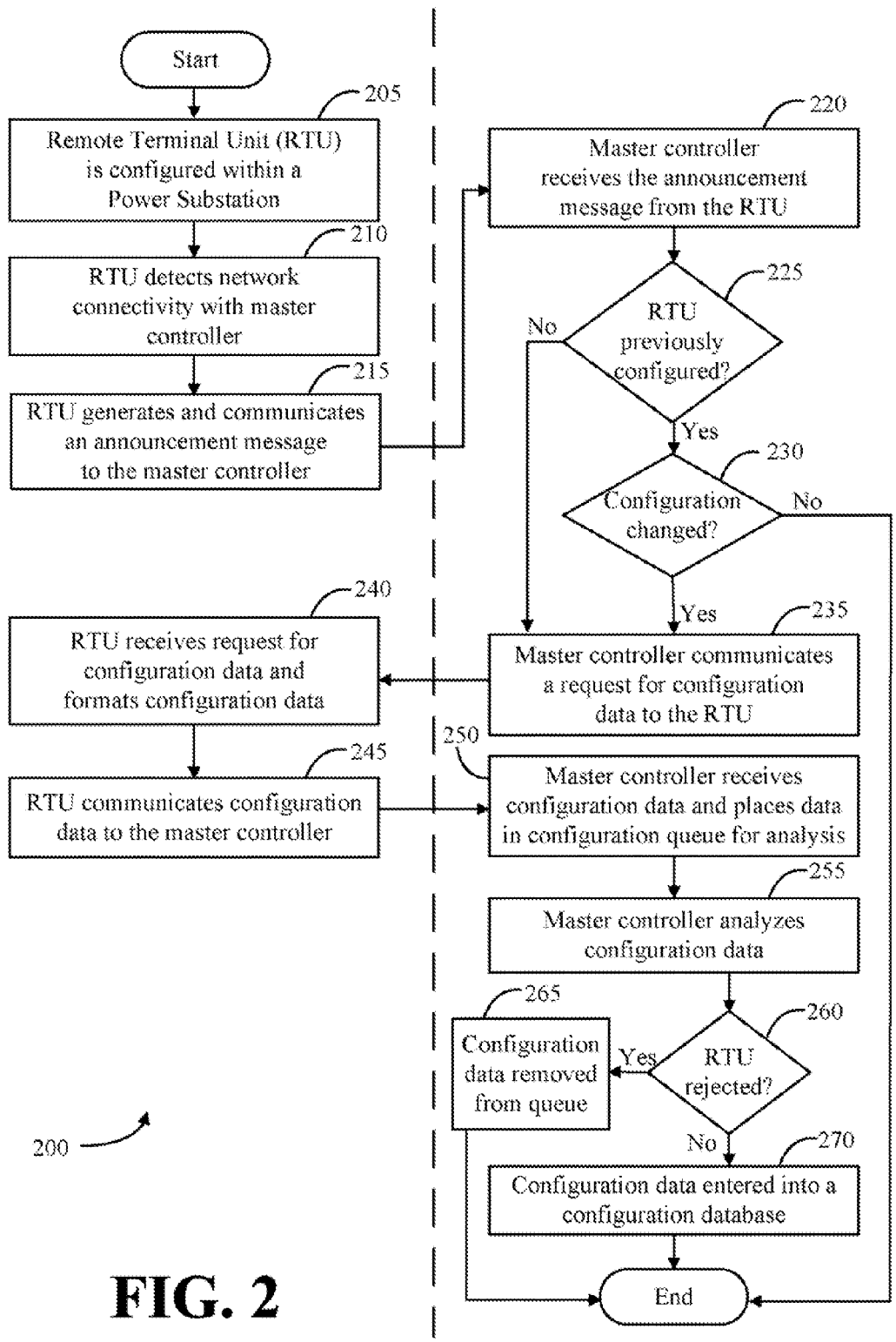

FIG. 2 is a flow chart of one example method for facilitating the configuration of a substation remote terminal with a central controller, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout Disclosed are systems and methods for facilitating the configuration of substation remote terminals with a central controller. In accordance with various embodiments of the invention, a central controller associated with a power system may be provided. Additionally, a remote terminal unit ("RTU") associated with a remote power substation that is included in or associated with the power system may be provided. The RTU may be configured at the substation in order to establish operating parameters for the RTU and/or to establish communication between the RTU and any number of other substation devices. Once the RTU has been configured and connected to suitable network, network connectivity between the RTU and the central controller may be detected. Based upon the detection of the network connectivity, the RTU may communicate a message identifying a current RTU status to the central controller. For example, a message may be communicated based upon an initialization of the RTU or based upon a detected change in a configuration of the RTU, such as an identified change in the configuration and/or connection of one or more substation devices to a substation network. In certain embodiments, the message may include a configuration identifier associated with the RTU, such as a configuration version number.

Once the message is received by the central controller, the central controller may analyze the message and determine whether configuration data for the RTU is desirable. For example, the central controller may determine whether a configuration for the RTU exists and/or whether a configuration for the RTU is up-to-date. In one example embodiment, a configuration identifier included in the message may be compared to a stored configuration identifier associated with the RTU, and a determination may be made that configuration data is desirable if a received identifier does not match the stored identifier. Based upon a determination that configuration data is desirable, the central controller may communicate a request for configuration data to the RTU. In certain embodiments, the request may specify a desired format for receiving the configuration data, such as a Common Information Model ("CIM") format, a specified format that utilizes Extensible Markup Language ("XML"), or any other format mutually agreed upon between the RTU and the central controller. Based upon the receipt of the request, the RTU may communicate the configuration data to the central controller. The configuration data may include a wide variety of information associated with operating parameters associated with the RTU and/or the substation devices, including power system model data associated with the substation devices. The central controller may receive the configuration data and utilize the received configuration data to establish a configuration of the RTU. For example, a configuration database maintained by the central controller may be updated to include at least a portion of the received configuration data. Once the RTU has been configured, the central controller may be able to communicate with the RTU and execute a wide variety of supervisory control and data acquisition procedures.

Various embodiments of the invention may include one or more special purpose computers, systems, and/or particular machines that facilitate the configuration of a remote terminal unit or remote controller with a central controller. A special purpose computer or particular machine may include a wide variety of different software modules and/or computer-implemented or computer-executable instructions as desired in various embodiments. As explained in greater detail below, in certain embodiments, these various software components may be utilized to facilitate that configuration of a RTU with a central controller.

Certain embodiments of the invention described herein may have the technical effect of facilitating the configuration of a remote terminal unit with a central controller. Additionally, certain embodiments of the invention may have the technical effect of facilitating configuration of a RTU with a central controller without a need to manually enter configuration data at the central controller. In this regard, data entry errors may be reduced, thereby reducing relatively expensive troubleshooting procedures associated with configuring the RTU with the central controller.

FIG. 1 is a block diagram of one example control system 100 that may be utilized in accordance with various embodiments of the invention. In certain embodiments, the control system may be a supervisory control and data acquisition ("SCADA") system. In one example embodiment, the control system 100 may be associated with a power generation and/or distribution network. The power generation and/or distribution network may include one or more power plants and/or power generation devices that are configured to supply electrical power to a power grid. The power generation and/or distribution network may further include any number of power substations distributed throughout the power distribution network. In another example embodiment, the control system 100 may be associated with a power plant including a central controller and any number of remote control stations and/or remote terminals.

With reference to FIG. 1, the control system 100 may include a master controller 105 (also referred to as a central controller or a control center) and at least one remote terminal unit ("RTU") 110 associated with a power substation 115 situated remotely to the master controller 105. The master controller 105 may communicate with the RTU 110 via any number of suitable networks 120 and/or communications buses. In certain embodiments, the master controller 105 may be a central controller or master controller for a SCADA system associated with a power generation and/or distribution network. Any number of remote terminal units 110 may be configured at the master controller 105. For example, configuration data for the RTUs 110 may be stored by the master controller 105 in one or more suitable configuration databases 125. A wide variety of different types of configuration data may be stored in the configuration database(s) 125 by the master controller 105, including but not limited to, operational data associated with one or more RTUs 110, identifiers and/or operational data associated with any number of devices (e.g., substation devices) in communication with the RTUs 110, one or more parameters that facilitate communication with the RTUs 110, etc.

The master controller 105 may include any number of control computers 107 and/or other processor-driven devices that control the operations of the control system 100. The control computers 107 may include, for example, any number of special purpose computers or particular machines, application-specific circuits, programmable logic controllers (PLC), microcontrollers, personal computers, minicomputers, mainframe computers, supercomputers, and the like. In certain embodiments, the operations of the control computers 107 may be controlled by computer-executed or computer-implemented instructions that are executed by one or more processors associated with the control computers 107. The instructions may be embodied in one or more software components as desired in various embodiments of the invention. The execution of the instructions may form a special purpose computer or other particular machine that is operable to facilitate the configuration of one or more RTUs 110 and control the operations of the control system 100. The one or more processors that control the operations of the control computers 107 may be incorporated into the control computers 107 and/or in communication with the control computers 107 via one or more suitable networks. In certain embodiments of the invention, the operations and/or control of the master controller 105 may be distributed among several processing components.

The control computers 107 may include one or more processors 130, one or more memory devices 131, one or more network interfaces 132, and/or one or more input/output ("I/O") interfaces 133. The one or more memory devices 131 may be any suitable memory devices, for example, caches, read-only memory devices, random access memory devices, magnetic storage devices, etc. The one or more memory devices 131 may store data, executable instructions, and/or various program modules utilized by the master controller 105, such as data files 134, an operating system ("OS") 135, a control module 136, and/or a configuration module 137. The data files 145 may include any suitable data associated with the operation of the control system 100 and/or the operation of the system and/or plants monitored by the control system 100, for example, measurements data, operating data, data associated with the operation of one or more RTUs 110, data associated with the operation of one or more substation devices 140, etc. Additionally, the one or more memory devices 131 may store any number of databases and/or logical memory constructs, such as one or more configuration database 125. The one or more configuration databases 125 may be operable to store configuration data associated with the RTUs 110 and/or various substation devices 140 managed by the RTUs 110. The OS 135 may include executable instructions and/or program modules that facilitate and/or control the general operation of the central controller 105. For example, the OS 135 may facilitate the execution of other software programs and/or program modules by the processors 130.

The control module 136 may be operable to monitor and/or control the overall operations of the control system 100 and/or the system or plant that is monitored and/or controlled by the control system 100. In doing so, the control module 136 may utilize various measurements and/or other data associated with the operation of the control system 100 and/or the monitored system (e.g., power distribution system, etc.) or plant. At least a portion of the utilized data may be received from the RTUs 110 and/or associated substation devices 140. The control module 136 may be further operable to generate command signals associated with the operation of the control system 100 and to direct the communication of the generated signals to other components of the control system 100, for example, to the RTUs 110. For example, the control module 136 may be operable or configured to process data received from one or more substation devices 140 and direct the communication of generated control signals or other messages to the substation devices 140 via the RTUs 110.

The configuration module 137 may be a suitable module that is operable to facilitate the configuration of one or more RTUs 110 and/or substation devices 140 that are in communication with the master controller 105. In operation, the configuration module 137 may generate and/or receive configuration data for the RTUs 110 and/or substation devices 140. For example, the configuration module 137 may receive configuration data from one or more RTUs 110. The received configuration data may include identification and/or operational data associated with the RTUs 110 and/or substation devices 140 in communication with the RTUs 110. For example, the configuration data may include power system model data associated with the substation devices 140. Utilizing received configuration data, the configuration module 137 may establish, initialize, update, and/or otherwise configure the RTUs 110 in order to facilitate communications between the master controller 105 and the RTUs 110. For example, the configuration module 137 may direct the storage of at least a portion of the configuration data in the configuration databases 125.

In one example embodiment of the invention, the configuration module 137 may receive a message from a RTU 110 that includes a current status of the RTU 110, such as a configuration identifier (e.g., a configuration number, configuration version, number, etc.) and/or an identifier of the RTU 110. The configuration module 137 may evaluate the received message in order to determine whether the RTU 110 has previously been configured with the master controller 105 and/or whether a previous configuration of the RTU 110 has been changed. For example, the configuration database 125 may be searched for configuration information associated with the RTU 110. If configuration information is available for the RTU 110, then an identifier of the configuration information (e.g., a configuration version identifier) may be compared to a received configuration identifier in order to determine whether the configuration of the RTU 110 has been changed.

If the configuration module 137 determines that the RTU 110 has not previously been configured or that a configuration of the RTU 110 has changed, then the configuration module 137 may generate a request for configuration data associated with the RTU 110 and/or any number of substation devices 140 associated with the RTU 110. The configuration module 137 may then direct the communication of the generated request to the RTU 110. As desired, the request may include information associated with a desired format for the configuration data, such as a Common Information Model ("CIM") format, a specified format that utilizes Extensible Markup Language ("XML"), any other format mutually agreed upon between the RTU and the central controller, or another suitable format for receiving configuration data. In response to a request, configuration data may be received by the configuration module 137. The received configuration data may be analyzed and/or processed by the configuration module 137 utilizing a wide variety of suitable methods and techniques. For example, a determination may be made as to whether the received data is properly formatted and/or whether the RTU 110 is authorized to be configured with the master controller 105. As desired, any number of exceptions may be triggered, and any number of error messages may be returned to the RTU 110. If, however, it is determined that the RTU 110 may be configured with the master controller 105, then the configuration module 137 may enter and/or update configuration data for the RTU 110 in the configuration database 125. In this regard, a RTU 110 may be configured at the master controller 105 without configuration information being manually entered at the master controller 105. One example of the operations that may be performed by the control module 137 is described in greater detail below with reference to FIG. 2.

With continued reference to FIG. 1, the network interface 132 may facilitate connection of the control computers 107 to the network(s) 120. In this regard, communication with other components of the system 100, such as the RTUs 110 may be facilitated. As desired, any number of input/output cards (e.g., Ethernet cards) and/or other devices that facilitate network communications may be provided. The I/O interfaces 133 may facilitate communication between the control computers 107 and one or more input/output devices, for example, one or more user interface devices, such as a display, keypad, mouse, pointing device, control panel, touch screen display, remote control, microphone, speaker, etc., that facilitate user interaction with the control computers 107. In this regard, user commands may be received by the control computers 107.

As desired, any number of RTUs 110 may be utilized in association with the control system 100. A RTU may also be referred to a substation automation system or a substation gateway. In one example embodiment, one or more RTUs 110, such as redundant primary and secondary RTUs, may be situated at a power substation 115 associated with the control system 100. Each RTU 110 may be operable to manage one or more substation devices 140 and/or communicate various measurements data and/or operational data to the master controller 105 via the one or more networks. Additionally, each RTU 110 may be operable to receive instructions from the master controller 105 and, as desirable, provide instructions to the substation devices 140 via one or more suitable substation buses 145 and/or substation networks.

Similar to the control computers 107 associated with the master controller 105, a RTU 110 may include any number of processor driven devices and/or processing components that facilitate the operations of the RTU 110. For example, the a RTU 110 may include any number of special purpose processing components, computing devices, particular machines, application specific circuits, programmable logic controllers (PLC), microcontrollers, minicomputers, and the like. In certain embodiments, the operations of the RTU 110 may be controlled by computer-executed or computer-implemented instructions that are executed by one or more processors or processing components associated with the RTU 110. The instructions may be embodied in one or more software components as desired in various embodiments of the invention. The execution of the instructions may form a special purpose computer or other particular machine that is operable to control the operations of the RTU 110 and/or to facilitate a configuration of the RTU 110 with the master controller 105. The one or more processing components that control the operations of the RTU 110 may be incorporated into the RTU 110 and/or in communication with the RTU via one or more suitable networks. In certain embodiments of the invention, the operations and/or control of the RTU 110 may be distributed among several processing components.

The RTU 110 may include one or more processors 150, one or more memory devices 151, one or more network interfaces 152, and/or one or more input/output ("I/O") interfaces 153. The one or more memory devices 151 may be any suitable memory devices, for example, caches, read-only memory devices, random access memory devices, magnetic storage devices, etc. The one or more memory devices 151 may store data, executable instructions, and/or various program modules utilized by the RTU 110, such as data files 154, an operating system ("OS") 155, a control module 156, and/or a configuration module 157. The data files 155 may include any suitable data associated with the operation of the RTU 100, the substation devices 140, and/or the master controller 105, for example, measurements data, operating data, communication protocol information, etc. The OS 155 may include executable instructions and/or program modules that facilitate and/or control the general operation of the RTU 110. For example, the OS 155 may facilitate the execution of other software programs and/or program modules by the processors 150.

The control module 156 may be operable to monitor and/or control the overall operations of the RTU 110, the substation 115, and/or the substation devices 140. In doing so, the control module 156 may utilize various measurements and/or other data associated with the operation of the substation 115 and/or the substation devices 140. At least a portion of the utilized data may be received from the substation devices 140 via the substation bus 145. The control module 156 may be further be operable to generate command signals and/or receive command signals from the master controller 105 and to provide command signals to any number of substation devices 140.

The configuration module 157 may be a suitable module that is operable to facilitate the configuration of the RTU 110 and/or substation devices 140 with the master controller 105. In operation, the configuration module 157 may identify a situation in which configuration with the master controller 105 is desirable. For example, the configuration module 157 may identify a situation in which the RTU 105 has been initially configured, such as manually configured at the substation 115. As another example, the configuration module 157 may identify a situation in which a configuration of the RTU 105 and/or the substation devices 140 has been altered or modified. For example, the configuration module 157 may identify a connection of one or more new substation devices 140 to a substation bus 145, a disconnection of one or more substation devices 140 from the substation bus 145, a failure of a substation device 140, a software upgrade or other configuration change for a substation device 140, a software upgrade or other configuration change for the RTU 110, a startup or initialization of the central controller, etc.

Once the configuration module 157 determines that configuration with the master controller 105 is desirable, the configuration module 157 may detect a network connectivity with the master controller 105, such as a network connectivity or network connection via the one or more networks 120. The configuration module 157 may generate an announcement message or other message to the master controller 105 indicating that configuration information for the RTU 110 and/or the substation devices 140 is available. A wide variety of information may be included in the announcement message as desired in various embodiments of the invention, such as an identifier of the RTU 110 (e.g., a network address, IP address, device identifier, etc.) and/or a status indicator of the RTU 110 (e.g., a configuration identifier, configuration version number, etc.). The configuration module 157 may direct the communication of the announcement message to the master controller 105 via the one or more networks 120.

If the master controller 105 determines that configuration information for the RTU 110 and/or the substation devices 140 is desirable, then the master controller 105 may communicate a request for configuration information to the RTU 110. In certain embodiments, the request may be received and processed by the configuration module 157. For example, the configuration module 157 may assemble configuration information for the RTU 110 and/or the substation devices 140 and direct the communication of the configuration information to the master controller 105. In this regard, a configuration of the RTU 110 may be established and/or updated at the master controller 105. A wide variety of configuration information may be communicated to the master controller 105 as desired in various embodiments of the invention, including but not limited to, communication protocols and/or communication parameters associated with the RTU 110 (e.g., a Distributed Network Protocol associated with the RTU 110, an International Electrotechnical Commission protocol associated with the RTU 110, etc.) and/or substation devices 140, device identifiers, a list of one or more parameters associated with the operation of the RTU 110 and/or substation devices 140, a number and/or type of data points supported by the RTU 110, scaling factor details associated with data points, and/or any other suitable configuration data. One example of the operations that may be performed by the control module 157 is described in greater detail below with reference to FIG. 2.

With continued reference to FIG. 1, any number of substation devices 140 may be utilized in association with the control system 100, for example, any suitable devices utilized to monitor and/or control operations within the substation 115. A wide variety of different types of substation devices 140 may be utilized as desired in various embodiments of the invention, including any number of H1 Fieldbus devices, any number of high-speed Ethernet ("HSE") Fieldbus devices, any number of International Electrotechnical Commission ("IEC") 60870 devices, any number of Distributed Network Protocol ("DNP") devices, any number of Modbus devices, etc. In embodiments of the invention that utilize Fieldbus devices, communications between the devices 140 and the RTU 110, which may be a HSE Fieldbus device, may be facilitated using a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within the substation 115, which enables these field devices to perform control functions at locations distributed throughout the substation and to communicate with one another before and after the performance of these control functions to implement an overall control strategy.

With continued reference to FIG. 1, the one or more illustrated networks 120 may include any suitable network or combination of networks that facilitate communications between the master controller 105 and the RTU 110. Similarly, the substation buses 145 or substation networks may include any number of suitable data buses and/or local area networks that facilitate communication between the RTU 110 and the substation devices 140. Examples of suitable networks and/or data buses include, but are not limited to, a local area network, a wide area network, the Internet, a radio frequency (RF) network, a Bluetooth™ enabled network, any suitable wired network, any suitable wireless network, or any suitable combination of wired and wireless networks. In certain embodiments of the invention, such as embodiments that utilize an Ethernet network, one or more Ethernet switches may be provided. The Ethernet switches may route data within the network 120. Each of the Ethernet switches may include hardware and/or software components that are operable to facilitate the routing of data within the network 120. Examples of suitable Ethernet switches include, but am not limited to, network bridges, multilayer switches, etc. Additionally, any number of firewalls may be established in association with the network 120.

As desired, embodiments of the invention may include a control system 100 with more or less than the components illustrated in FIG. 1. The control system 100 of FIG. 1 is provided by way of example only.

FIG. 2 is a flow chart of one example method 200 for facilitating the configuration of a substation remote terminal with a central controller, according to an illustrative embodiment of the invention. Operations of the method 200 may be performed by a suitable remote terminal unit ("RTU") and master controller, such as the RTU 110 and the master controller 105 illustrated in FIG. 1. The method may begin at block 205.

At block 205, a RTU 110 may be configured at or within a power substation, such as the substation 115 illustrated in FIG. 1. In one example embodiment, the RTU 110 may be initially configured or set up by one or more technicians working within the substation 115. In another example embodiment, the RTU 110 may be reconfigured by one or more technicians. In another example embodiment, an alteration in the substation devices, such as the substation devices 140 illustrated in FIG. 1, in communication with the RTU 110 and/or connected to a substation network may be identified by the RTU 110. In other words, an initial configuration or change in configuration of the RTU 110 may be performed and/or identified.

At block 210, the RTU 110 may detect network connectivity between the RTU 110 and the master controller 105. For example, the RTU 110 may detect one or more available network connections that facilitate communication between the RTU 110 and the master controller 105. In one example embodiment, the RTU 110 may be connected to a network that facilitates communication within a control system, such as the network 120 illustrated in FIG. 1. Once connected, the RTU 110 may identify the master controller 105.

At block 215, the RTU 110 may generate an announcement message and direct the communication of the generated announcement message to the master controller 105. The announcement message may include an indication that configuration data for the RTU 110 is available for communication to the master controller 105. A wide variety of information may be included in the announcement message as desired in various embodiments of the invention, such as an identifier of the RTU 110 (e.g., a network address, a device identifier, etc.) and a status indicator for the RTU 110. The status indicator of the RTU 110 may include a current configuration status for the RTU 110, such as a configuration number and/or a configuration version number for the RTU.

At block 220, the master controller 105 may receive the announcement message from the RTU 110. A determination may then be made at block 225 as to whether the RTU 110 has previously been configured with the master controller 105. For example, a determination may be made as to whether configuration information for the RTU 110 is stored in a configuration database, such as the database 125 illustrated in FIG. 1. In one example embodiment, an identifier of the RTU 110 may be utilized to search the configuration database 125 in order to determine whether the RTU 110 has previously been configured with the master controller 105. If it is determined at block 225 that the RTU 110 has not previously been configured with the master controller 105, then operations may continue at block 235 described below. If, however, it is determined at block 225 that the RTU 110 has been previously configured with the master controller 105, then operations may continue at block 230.

At block 230, a determination may be made by the master controller 105 as to whether the configuration of the RTU 116 has changed or been modified following a previous configuration of the RTU 110 with the master controller 105. For example, the received status indicator (e.g., configuration version number, etc.) for the RTU 110 may be compared to a stored status indicator associated with a previous configuration for the RTU 110. If the received status indicator does not match the stored indicator, then a determination may be made that the configuration of the RTU 110 has been modified or changed. If it is determined at block 230 that the configuration of the RTU 110 has not changed, then operations may end. If, however, it is determined at block 230 that the configuration of the RTU 110 has been changed or modified, then operations may continue at block 235.

At block 235, the master controller 105 may generate and communicate a request for configuration data to the RTU 110. As desired in certain embodiments, the request for configuration data may include a desired format for receiving the configuration data. A wide variety of formats for receiving configuration data may be utilized as desired in various embodiments of the invention, such as a Common Information Model ("CIM") format, a specified format that utilizes Extensible Markup Language ("XML"), or any other format mutually agreed upon between the RTU and the central controller.

The request for configuration data may be received by the RTU 110 at block 240. Based upon the received request, the RTU 110 may generate and/or assemble various configuration data associated with the RTU 110 and/or any number of substation devices associated with the RTU 110, such as the substation devices 140 illustrated in FIG. 1. A wide variety of configuration information may be assembled as desired in various embodiments of the invention, including but not limited to, operational data associated with one or more RTUs 110, identifiers and/or operational data associated with any number of devices (e.g., substation devices) in communication with the RTUs 110, one or more parameters that facilitate communication with the RTUs 110, etc. Additionally, in certain embodiments, the configuration data may be formatted in accordance with a desired format. Once assembled, the configuration data may be communicated to the master controller 105 at block 245.

The master controller 105 may receive the configuration data from the RTU 105 at block 250. Once received, the master controller 105 may place the configuration data in a configuration queue for analysis. At block 255, the master controller 105 may analyze and/or evaluate the received configuration data Based upon the analysis, the master controller 105 may determine at block 260 whether the configuration for the RTU 110 should be rejected. For example, the master controller 105 may perform any number of suitable tests on the configuration data in order to validate the configuration data and/or the RTU 110. As one example, the master controller 105 may perform a security check and determine whether the RTU 110 is authorized to communicate with the master controller 105. If it is determined at block 260 that the configuration for the RTU 110 is rejected, then operations may continue at block 265 and the received configuration data for the RTU 110 may be deleted or otherwise removed from the configuration queue. As desired, any number of suitable error messages and/or exceptions messages associated with the failed configuration of the RTU 110 may be communicated by the master controller 105 to the RTU 110.

If, however, it is determined at block 265 that the configuration for the RTU 110 is not rejected or that the configuration is accepted, then operations may continue at block 270. At block 270, at least a portion of the received configuration data may be stored in one or more suitable configuration databases 125. In this regard, the RTU 110 may be configured with the master controller 105 in order to facilitate subsequent communications between the master controller 105 and the RTU 110. Additionally, the RTU 110 may be configured with the master controller 105 without configuration data being manually entered a the master controller 105, thereby reducing configuration errors resulting from manual data entry.

The method 200 may end following either block 230, 265, or 270.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for configuring a substation remote terminal with a central controller, the method comprising:
receiving, by a central controller associated with a power system from a remote terminal unit (RTU) associated with a remote power substation, a message identifying a current status of the RTU;
communicating, by the central controller to the RTU based upon an analysis of the received message, a request for configuration data associated with the RTU, wherein the analysis comprises determining that a configuration associated with the RTU has been altered based at least in part on a comparison between a configuration identifier in the received message and a stored configuration identifier;
receiving, by the central controller from the RTU in response to the request, the configuration data;
storing, by the central controller, the configuration data in a configuration queue for validation, wherein at least a first portion of the configuration data is associated with one or more substation devices in communication with the RTU;
determining, by the central controller, whether the configuration associated with the RTU is valid based at least in part on the configuration data;
if the configuration associated with the RTU is not valid, then deleting from the configuration queue, by the central controller, at least a second portion of the configuration data associated with at least one of the one or more substation devices; and
if the configuration associated with the RTU is valid, then updating, by the central controller based upon at least a portion of the received configuration data, a configuration database comprising information associated with the configuration of the RTU in order to facilitate supervisory control and data acquisition operations with the RTU by the central controller.

2. The method of claim 1, wherein receiving the configuration data comprises receiving the configuration data in one of (i) a Common Information Model (CIM) format or (ii) a specified format in Extensible Markup Language (XML).

3. The method of claim 1, further comprising:
identifying, by the central controller, a desired format for receiving the configuration data,
wherein communicating a request for configuration data comprises communicating a request for configuration data formatted in accordance with the identified desired format.

4. The method of claim 1, wherein communicating a request for configuration data comprises:
determining, based upon an analysis of the received message, that the RTU has not previously been configured with the central controller; and
communicating the request based upon the determination that the RTU has not previously been configured with the central controller.

5. The method of claim 1, wherein receiving a message identifying a current status of the RTU comprises receiving a message including an identifier of a configuration version number associated with the RTU, and wherein determining that a configuration of the RTU has been altered comprises:
comparing the configuration version number to a stored configuration version number associated with the RTU; and
determining that the configuration version number does not match the stored configuration version number.

6. The method of claim 1, wherein the at least a portion of the received configuration data was not deleted from the configuration queue.

7. A system for configuration of a substation remote terminal with a central controller, the system comprising:
a central controller associated with a power system; and
a remote terminal unit (RTU) situated at a power substation associated with the power system, the remote terminal unit configured to (i) communicate, to the central controller, a message identifying a current status of the RTU, (ii) receive, from the central controller, a request for configuration data associated with the RTU, and (iii) communicate the requested configuration data to the central controller,
wherein the central controller is configured to (i) receive the message communicated by the RTU, (ii) communicate the request for configuration data based upon an analysis of the received message, wherein the analysis comprises determining that a configuration associated with the RTU has been altered based at least in part on a comparison between a configuration identifier in the received message and a stored configuration identifier, (iii) receive the configuration data, and (iv) store the configuration data in a configuration queue for validation, wherein at least a first portion of the configuration data is associated with one or more substation devices in communication with the RTU; (v) determine whether the configuration associated with the RTU is valid based at least in part on the configuration data; (vi) if the configuration associated with the RTU is not valid, then delete from the configuration queue, by the central controller, at least a second portion of the configuration data associated with at least one of the one or more substation devices; and if the configuration associated with the RTU is valid, then update, by the central controller based upon at least a portion of the received configuration data, a configuration database comprising information associated with the configuration of the RTU in order to facilitate supervisory control and data acquisition operations with the RTU by the central controller.

8. The system of claim 7, wherein the configuration data is formatted in accordance with one of (i) a Common Information Model (CIM) format or (ii) a specified format in Extensible Markup Language (XML).

9. The system of claim 7, wherein the central controller is further configured to identify a desired format for receiving the configuration data, and
wherein the request comprises an identification of the desired format.

10. The system of claim 7, wherein:
the central controller is further configured to determine, based upon an analysis of the received message, that the RTU has not previously been configured with the central controller, and
the request is communicated based at least in part on the determination that the RTU has not previously been configured with the central controller.

11. The system of claim 7, wherein:
the received message comprises an identifier of a configuration version number associated with the RTU, and
wherein the central controller determines that the configuration of the RTU has been altered by (i) comparing the configuration version number to a stored configuration version number associated with the RTU and (ii) determining that the configuration version number does not match the stored configuration version number.

12. The system of claim 7, wherein the at least a portion of the received configuration data was not deleted from the configuration queue.

13. A method for configuring a substation remote terminal with a central controller, the method comprising:
configuring a remote terminal unit (RTU) associated with a remote power substation, the remote power substation associated with a power system;
detecting, by the RTU, a network connectivity with a central controller associated with the power system;
communicating, by the RTU to the central controller based at least in part on the detected network connectivity, a message identifying a current status of the RTU;
receiving, by the RTU from the central controller based upon an analysis of the message by the central controller, a request for configuration data associated with the RTU, wherein the analysis comprises determining that a configuration associated with the RTU has been altered based at least in part on a comparison between a configuration identifier in the message and a stored configuration identifier;
communicating, by the RTU to the central controller in response to the request, the configuration data associated with the RTU;
wherein the central controller utilizes the configuration data to:
store the configuration data in a configuration queue for validation, wherein at least a first portion of the configuration data is associated with one or more substation devices in communication with the RTU;
determine whether the configuration associated with the RTU is valid based at least in part on the configuration data;
if the configuration associated with the RTU is not valid, then delete from the configuration queue at least a second portion of the configuration data associated with at least one of the one or more substation devices; and
if the configuration associated with the RTU is valid, then update a configuration database comprising information associated with the configuration of the RTU in order to facilitate supervisory control and data acquisition operations with the RTU by the central controller.

14. The method of claim 13, wherein communicating the configuration data comprises communicating the configuration data in one of (i) a Common Information Model (CIM) format or (ii) a specified format in Extensible Markup Language (XML).

15. The method of claim 13, wherein receiving a request for configuration data comprises receiving a request indicating a desired format for the configuration data, and further comprising:
formatting, by the RTU prior to communicating the configuration data, the configuration data in accordance with the desired format.

16. The method of claim 13, further comprising:
detecting, by the RTU, a change in the configuration of the RTU based at least in part on a configuration version number associated with the RTU,
wherein communicating a message comprises communicating a message based at least in part upon the detection.

17. The method of claim 16, wherein detecting a change in the configuration of the RTU comprises detecting at least one of (i) an initialization of the RTU, (ii) a connection of one or more substation devices to a substation network managed by the RTU, (iii) a disconnection of one or more substation devices from the substation network, (iv) an initialization of the central controller, or (v) an alteration of software executed by the RTU.

* * * * *

UNITED STATES PATENT AND TRADEMARK OFFICE
CERTIFICATE OF CORRECTION

PATENT NO. : 8,451,753 B2
APPLICATION NO. : 12/881579
DATED : May 28, 2013
INVENTOR(S) : Vanga et al.

It is certified that error appears in the above-identified patent and that said Letters Patent is hereby corrected as shown below:

In the Specification

In Column 2, Line 67, delete "throughout" and insert -- throughout. --, therefor.

In Column 3, Line 34, delete "a the" and insert -- the --, therefor.

In Column 5, Line 18, delete "data files 145" and insert -- data files 134 --, therefor.

In Column 7, Line 51, delete "data files 155" and insert -- data files 154 --, therefor.

In Column 7, Line 52, delete "RTU 100," and insert -- RTU 110, --, therefor.

In Column 8, Line 12, delete "RTU 105" and insert -- RTU 110 --, therefor.

In Column 8, Line 16, delete "RTU 105" and insert -- RTU 110 --, therefor.

In Column 9, Line 47, delete "am not" and insert -- are not --, therefor.

In Column 10, Line 49, delete "RTU 116" and insert -- RTU 110 --, therefor.

In Column 11, Line 25, delete "RTU 105" and insert -- RTU 110 --, therefor.

In Column 11, Line 29, delete "data Based" and insert -- data. Based --, therefor.

In Column 11, Line 55, delete "a the" and insert -- the --, therefor.

Signed and Sealed this
Twenty-ninth Day of October, 2013

Teresa Stanek Rea
*Deputy Director of the United States Patent and Trademark Office*